United States Patent [19]

DeCarlo et al.

[11] Patent Number: 4,876,897
[45] Date of Patent: Oct. 31, 1989

[54] STEAM QUALITY MEASUREMENT APPARATUS AND METHOD

[75] Inventors: Joseph P. DeCarlo; Thomas M. Kegal, both of Wrentham, Mass.

[73] Assignee: The Foxboro Company, Foxboro, Mass.

[21] Appl. No.: 130,908

[22] Filed: Dec. 10, 1987

[51] Int. Cl.$^4$ .......................... G01F 1/32; G01F 1/74
[52] U.S. Cl. ...................................... 73/861.04; 73/29
[58] Field of Search ................... 73/29, 861.04, 861.21

[56] References Cited

U.S. PATENT DOCUMENTS

| | | | |
|---|---|---|---|
| 3,927,566 | 12/1975 | Zanker | 73/194 VS |
| 3,979,954 | 9/1976 | Ide et al. | 73/194 VS |
| 4,010,645 | 3/1977 | Herzl | 73/861.04 |
| 4,048,854 | 9/1977 | Herzl | 73/861.04 |
| 4,385,526 | 5/1983 | Huthloff | 73/861.22 |
| 4,442,711 | 4/1984 | Hulin | 73/155 |

OTHER PUBLICATIONS

"Orifice Meter Measures Steam Quality", J. A. Pryor, Oil and Gas Journal, May 30, 1966.

"Metering Steam Accurately and Reliably," D. May, Control and Instrumentation, Oct. 1985.

"Evaluations of Correlations for Two-Phase Flowmeters Three Current One Now", R. V. Smith et al, J. Eng. for Power, Oct. 1975, pp. 589–595.

*Primary Examiner*—Stewart J. Levy
*Assistant Examiner*—Robert P. Bell
*Attorney, Agent, or Firm*—Jules Jay Morris; Michael L. Sheldon; Terrence (Terry) Martin

[57] ABSTRACT

It has been discovered that vortex flowmeters can be suitably adapted for the measurement of two-phase fluid flows, and particularly for the measurement of steam quality, when disposed in a particular manner in horizontal flowpipes carrying such fluids. More specifically, the invention disclosed includes the disposition of a substantially linear vortex flowmeter horizontally and transversely in a horizontal flowpipe to measure two-phase fluid flows, for example, wet steam quality. When the mass flow rate is not determinable through knowledge of the feedstock, other sensors enable measurement of the vapor phase volumetric area and velocity to permit calculation of the flow measurand.

3 Claims, 3 Drawing Sheets

STEAM QUALITY MEASUREMENT APPARATUS AND METHOD

TECHNICAL FIELD

The present invention relates to apparatus and method for measuring two-phase flow of materials, and is directed particularly to the measurement of wet steam quality. More specifically, the present invention discloses apparatus and methods for the measurement of steam quality for enhanced oil recovery (EOR) use.

BACKGROUND OF THE INVENTION

Water can exist as either a gas or a liquid under saturated conditions. Wet steam can contain both gas and liquid components, known to those of ordinary skill in the art as two-phase flow. A common method of expressing the quantities of each phase, known as steam quality, is the ratio of the mass flow rate of the gas phase to the total mass flow rate, and is given as a number less than one, or as a percentage.

Enhanced oil recovery boilers in oil fields, where steam is used to improve oil production, is one major area where there is a need to measure steam quality. Typically, the steam produced is directed to one or more headers, from which steam is directed to a multiplicity of wells or to wells owned or operated by differing business entities. Models have been developed for determining the optimum steam quality for a given field. It is desireable for the purchaser to know what the steam quality is in order to accurately determine the proper price to pay for the steam. It is believed that a value of steam quality exists which optimizes the cost of production in a particular field. It is important to the producer to operate at the appropriate steam quality required for optimum production costs. A need for accurate apparatus and methods for measuring steam quality has therefore existed for the many years in which steam has been used in EOR operations and for other uses.

In an attempt to increase productivity, a number of methods currently exist for measuring steam quality. An early reference to the "measurement" of steam quality in enhanced oil recovery operations was proposed in 1966 by Shell Oil Co. (Oil & Gas Journal, May 30, 1966). In this reference, the measurement is made by orifice plate in a manner similar to the present application of the vortex shedding flowmeter. The orifice equation is derived from L. P. Spink, "Principles of Flow Meter Engineering", The Foxboro Company. The correction for the presence of condensate (wet steam) assumes that the gas and liquid phases travel at the same velocity. It is now well known that as the quality of steam decreases the velocity difference between the two phases increases, thus limiting the accuracy of the orifice equation. The inaccuracies at lower quality levels noted by the author are believed due to this velocity difference. The determination of steam quality according to the present invention is considered to be an improvement over one based on an orifice plate measurement. This improvement is a result of using a vortex shedding flowmeter oriented according to the present invention. The primary result of this improvement is an extended range linear measure of the steam quality.

The prior art methods for measuring steam quality are described in U.S. patent application 06/746,593, "Downhole Steam Quality Measurement", now U.S. Pat. No. 4,658,208 to inventors Lee, Montoya, Muir, and Wayland, (hereinafter "Lee"). The Lee application is directed to a device made from special flow-through grids which allegedly allow measurement of two-phase steam flows without interfering with the flow. Lee provides only an inference of steam quality, by measurement of the cross-section averaged void fraction of the flow. The void fraction is defined as the portion of the flow area occupied by the gas phase. Under conditions where both phases travel at the same velocity, the void fraction is proportional to quality (the proportionality being the individual phase densities). Apparently, when a difference in velocity exists the quality and void fraction have some unknown degree of relation and thus the one may be derived by inference from a measure of the other. The present invention provides inference of steam quality by measurement of the velocity of the gas phase. Neither technique provides a direct measurement. Thus, simply put, the Lee reference teaches another solution to the same measurement problem.

It is felt that the present invention represents an improvement over Lee. Both methods rely on inferring steam quality from other measurements. Neither provides a direct measure of steam quality. The apparatus for both methods must be calibrated: the potential exists for differences in the nature of the two-phase flow between operating conditions and those under which calibration was performed. An advantage of the present invention lies in the confidence in the similarity of the flow conditions experienced compared with those under which calibration occurred. Differences in the flow include different relationships between the void fraction, phase velocities, and the quality. EOR measurement needs, for example and not limitation, concern the delivery of thermal energy to the oil field; the quality is merely a convenient measurement representing the thermal energy of the fluid. In the absence of a direct steam quality measurement, information concerning the gas phase veocity provides an indication of the energy contained within the gas phase. It is well-known that this represents most of the energy within the flowing fluid. A measure that indicates void fraction does not provide any indication of the energy flow.

In addition to the methods of Shouman, Wang, and Collins described in the Lee application, applicants note that U.S. Pat. No. 4,409,825 to Martin et al; U.S. Pat. No. 4,547,078 to Long et al; U.S. Pat., No 4,581,926 to Moore et al; and U.S. Pat. No. 4,442,711 are directed to measurement of steam quality and/or flow. Further, Engineering Measurements Co., of Longmont, Colo. (USA) is believed to market a "Q-Bar Steam Quality Meter"; "Measuring Steam Accurately and Reliably", Control & Instrumentation, Oct. 1985, "Microprocessor-Based Steam Generator Quality Controller" by Anderson et al, Society of Petroleum Engineers, September 1984; "Microprocessor System Optimizes Steam Generator/EOR Operation", by Harris, Oil & Gas Journal, March 10, 1986; and an article titled "Texaco Can Measure Steam Quality", (believed related to U.S. Pat. No. 4,547,078), Petroleum Engineer International, April, 1983 describe various operations and methods for determining steam quality.

Published information concerning the use of vortex flowmeters in measuring two-phase flow is somewhat limited. Articles which treat the subject include: "Experiments With a Vortex Shedding Flowmeter in Two-Phase Air-Water Flow", K. G. Turnage, Oak Ridge National Laboratories report NUREG/CR-1418 ORNL/NUREG/TM-387, June 1980; and "A Feasibility Study of a Vortex Flowmeter for a Two-Phase Flow", S. B. Loesch (Bachelor of Science Thesis), Massachusetts Institute of Technology, Cambridge, MA, 1978. "Metering Steam Accurately and Reliably", by D. May, Control & Instrumentation, October, 1985 deals with steam measurements by vortex flowmeter.

The Turnage article describes experiments with a commercial vortex flowmeter (believed to be a Fischer & Porter 10LV) which experiments were performed in vertical flow. The flowmeter tested featured a sensing scheme which measured the average forces across the pipe diameter. The author judged that this sensing scheme would have greater chances of successfully measuring the steam than a localized sensor, apparently assuming that a localized sensor would be more sensitive to localized effects (e.g., droplets in the flow) than the vortex shedding. Turnage concluded that (for vertical flow conditions) vortex shedding might work for very low and very high void-fraction flows. Among the implications inferable from the article were that the then-currently available vortex flowmeters only worked under conditions wherein the flow is reasonably homogeneous.

The Loesch MIT thesis reflects a study which involved a lab-built vortex shedding flowmeter having a flat plate and operating within an air/water droplet flow. The observed pressure oscillations were of much lower frequency than expected; the study attributed this inaccuracy to water collecting on the back edge of the shedder, thereby affecting the vortex shedding action unpredictably. The signal contained excessive noise. The study suggested that even if the problem of water collection and release could be overcome that the signal produced by vortex flowmeters would not be 'clean' enough for practical uses without additional signal-processing apparatus.

May discusses the use of vortex meters in steam flow in general; it is only generally relevant to the present invention. The May article is directed to an application which is substantially concerned with metering superheated (gas phase only) steam. The relatively brief mention (at page 99, column 2) of wet steam suggests that the meter will not operate accurately under such conditions due to noise. May is valuable inasmuch as it teaches the general advantages of vortex meters compared with orifice plate sensing in high-pressure and/or superheated steam metering applications. The advantages described for steam measurement lend support to the belief that the vortex meter technique of the present invention is a substantial improvement over the orifice plate technique.

U.S. Pat. No. 4,442,711 to Hulin et al. teaches the use of a modified vortex generating and sensing device including added means to induce turbulence upstream of the vortex flowmeter apparatus and added means to reduce turbulence downstream of the vortex flowmeter apparatus. Such are not generally used in the present invention.

BRIEF DESCRIPTION OF THE INVENTION

Steam quality is usually determined in accordance with the formula shown in Equation 1, $$x = \text{moles}_{gas}/\text{moles}_{total} \quad \text{(Equation 1)}$$

wherein steam quality "x" is defined as the ratio of the mass flow rate of the gas phase to the total mass flow rate of the two-phase flow.

The present invention is directed to the use of a conventional vortex shedding flowmeter in which the bluff body, or vortex shedding bar, is mounted in a particular configuration. This unusual configuration has unexpectedly been discovered to be effective in measuring two-phase flows, particularly wet steam. It is especially useful in enhance oil recovery (EOR) operations.

In the present invention, the vortex shedding flowmeter is mounted such that the vortex generating bar is horizontal, or parallel to the ground, in a flowpipe which which runs horizontal. The vortex generating bar is preferably disposed centrally within the steam pipe, and perpendicular to the longitudinal axis of the pipe.

The requirement for this mounting configuration arises from the two-phase flow distribution in the horizontal pipe. In such case, nearly all of the liquid phase flows within a thick layer occupying the lowest portion of the pipe cross section. The remaining liquid is carried as small droplets by the gas phase. If the shedding bar were mounted vertically, the vortex generating bar is at least partly immersed in the liquid layer and the shedding process or signal, or both, are rendered substantially less useful as accurate steam flow information is not available. If the vortex generating bar is mounted horizontally within specified limits above the liquid film plane, the vortex flowmeter substantially measures the gas velocity. Because the gas velocity is increased or decreased by the presence of more or less of the liquid phase, the meter for all practical purposes responds to the steam quality.

For many practical applications the flow of fluid within a pipe can be characterized by specification of the mass flow rate. For a given flow area of pipe the mass flow rate of a single phase fluid (gas or liquid) can be determined from measurement of two variables: the flow rate and the density. The density may be determined from measurement of the fluid pressure and the fluid temperature. The output of a vortex shedding flowmeter provides a measure of the velocity.

Similar characterization of a two-phase fluid flow requires the knowledge of the mass flow rates of both the gas and the liquid phases, thus measurement of four independent variables (i.e., the velocities and densities of each phase). For wet steam only, however, given either a pressure or temperature measurement, the densities of both phases can be determined. In addition, knowledge of the area through which each phase flows requires a another independent variable. Only one area variable is required because the sum of the flow areas (i.e., the pipe cross sectional flow area), is known. These five variables can be represented in a variety of different forms well known to those of ordinary skill in the art.

It has been unexpectedly discovered that a particular combination of only four readily determinable independent variables yields a useful measure of two-phase flows when the gas phase velocity is determined by a vortex flowmeter configured according to the present invention. This permits a particularly good method of measuring steam quality. These four variables include: total mass flow rate, gas phase density, liquid phase density, and gas phase velocity (as measured by the vortex shedding flowmeter in a particular configuration). This discovery results from two-phase and wet steam measurement experiments conducted over a range of operating conditions. Therefore, it is believed that knowledge of only these four (and not five) independent variables can completely characterize a particular two-phase fluid flow. With regard to the control of a "once-through" boiler such as is typically used in enhanced oil recovery, measurements of these four independent variables are readily made. These measurements adequately characterize the flow, hence the quality can be determined and thus controlled as desired.

Many applications exist wherein the total mass flow rate is not known. One example is where there are multiple distributions where access to the sources of the mass flow rate are not available. For such conditions a further measurement can be made of the average area occupied by the respective gas and liquid phases. This measurement can be made, for example but not limitation, of electrical capacitance of the fluid. An example of such a method is given by the Lee et al specification. Those with ordinary skill in the art will recognize that other techniques are available to make such a measurement.

BRIEF DESCRIPTIN OF THE DRAWING FIGURES

DETAILED DESCRIPTION OF THE PREFERRED EMBODIENT

Figure 1:
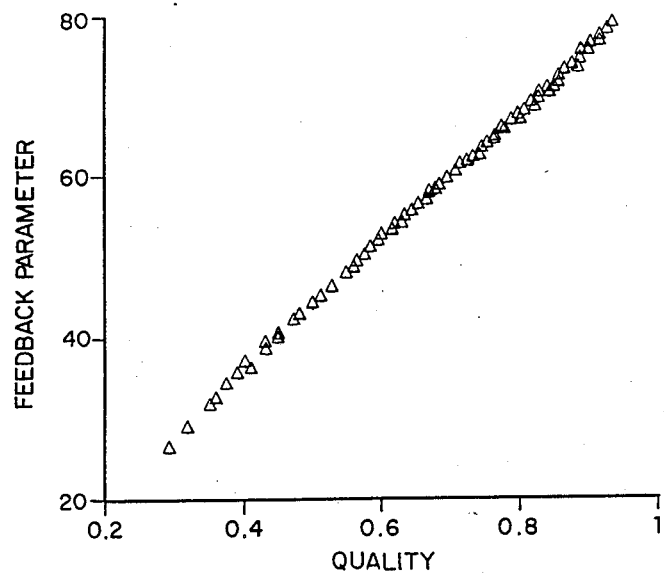
FIG. 1 shows a compilation of experimental data resulting from testing of the present invention in two-phase flow.

An important aspect of sensing two-phase flows, such as wet steam, is how the meter reacts to the distribution of liquid and vapor within the flow. The phase distribution in wet steam is believed to be primarily dependent on the quality. A brief discussion of the distribution of the phases within a horizontally oriented flowpipe during heating of the flow, believed representative of the process within an ehnanced oil recovery (EOR) boiler follows.

In an EOR boiler containing water and being heated, upon reaching saturation temperature the water begins to boil and steam bubbles develop, rising to the top of the pipe. As more heat is added, the steam bubbles coalesce, forming vapor 'slugs' the size of which approach the pipe diameter. At this time, the quality of the steam so produced is believed very low, on the order of less than 5%. Continued heating results in a gravity stratified flow, in which most of the flow area is occupied by a mixture of liquid droplets and steam vapor. That portion of the liquid existing as droplets within the vapor is believed to be very small; most of the liquid exists as a film which varies in thickness around the pipe internal surface. The nature of this film is related to the steam quality; observations indicate that this phase distribution characterizes the wet steam over most of the steam quality range, from about 5% to about 90% steam quality.

The following description is provided to illustrate the effect of flow quality for the occurrence of a reduction in quality under conditions of constant mass flow rate. This might occur, for example, if the heating rate of a boiler were reduced while the feedwater flow rate were held constant. This results in the condensation of a portion of the vapor into liquid. The condensate collects in the liquid film. The volume of this additional liquid is substantially less than the decrease in the volume of the vapor because the densities differ significantly. The ratio of liquid density to vapor density may approach 1600 to 1. The vapor velocity necessarily decreases because the decrease in vapor volumetric flow rate is greater than the decrease in the area through which it flows.

The velocities of the gas and liquid phases are also affected by their distribution within the flow. Since the vapor portion of the film is driven by the pressure gradient, the liquid in the film is driven by the vapor; it is effectively 'dragged' along. The velocity difference between the vapor and the liquid is therefore very large. The difference is sufficiently great that the presence of the liquid film can be considered as blockage of vapor flow area.

Simply stated, as the quality of the steam increases (with total mass flow rate held constant), a greater proportion of the flow is gas. The gas volumetric flow rate, and therefore the gas velocity, increase because of the lower density of the gas as compared to that of the liquid. The vortex flowmeter, disposed horizontally across the flowpipe according to the present invention, is a velocity sensitive instrument, and so responds to the increased gas velocity. It should be noted that when the vortex shedding bar of the vortex flowmeter is disposed vertically, according to convention, or in a non-horizontal flowpipe, the vortex meter output becomes erratic and performance is unpredictable.

It is essential to the present invention that the flowmeter selected be such that the vortex shedding frequency be linearly proportional to the fluid velocity. This requirement is met, for example, by the Model E83 vortex flowmeter available from The Foxboro Company, Foxboro, Mass.

Figure 2:
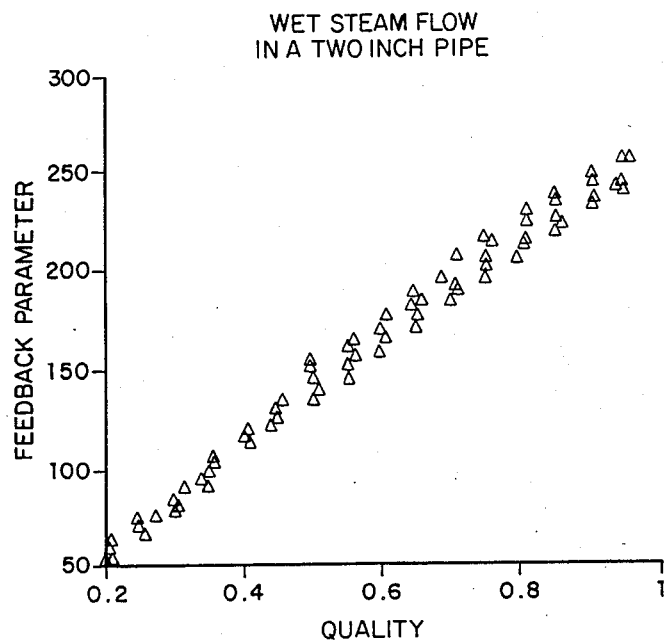
FIG. 2 shows a compilation of experimental test results in actual wet steam.

A series of tests were performed in which such a vortex flowmeter was tested under two-phase flow conditions, involving a mixture of air and water (see FIG. 1). Additional tests were conducted with wet steam (see FIG. 2). Inlet mass flow rates (both liquid and gas) were measured and the frequency output of a mass flowmeter was measured, with the air/water data being shown in FIG. 1. The wet steam tests produced similar results. A nearly linear relationship was shown to exist in which the measured two-phase flow is equal to the product of the frequency and a constant, divided by the mass flow rate. In FIG. 1, the ordinate is the ratio of the vortex frequency to total (gas plus liquid) mass flow rate, and the abscissa is the quality as determined by the formula of Equation 1. It can be seen that the steam quality ('x' of Equation 1) can be determined from the frequency output of the vortex flowmeter through which the two-phase flow is passed FIG. 2 shows data taken from an actual wet steam test set up.

A simplified control scheme for the present invention requires control of only two variables: steam quality and mass flow rate. The mass flow rate is determined by metering the feedwater to the boiler. The feedwater flow rate is controlled, for example, by a valve. The steam quality is controlled by the boiler temperature. A vortex flowmeter measuring steam quality provides an output feedback signal which is the ratio of the vortex frequency to the feedwater mass flow rate. As the steam quality increases (with the total mass flow rate held constant), a greater proportion of the flow is gas. The vortex flowmeter is sensitive to and responds to the gas velocity. The gas volumetric flow rate, and thus the gas velocity, increases due to the lower density of the gas as compared to the liquid.

Figure 3:
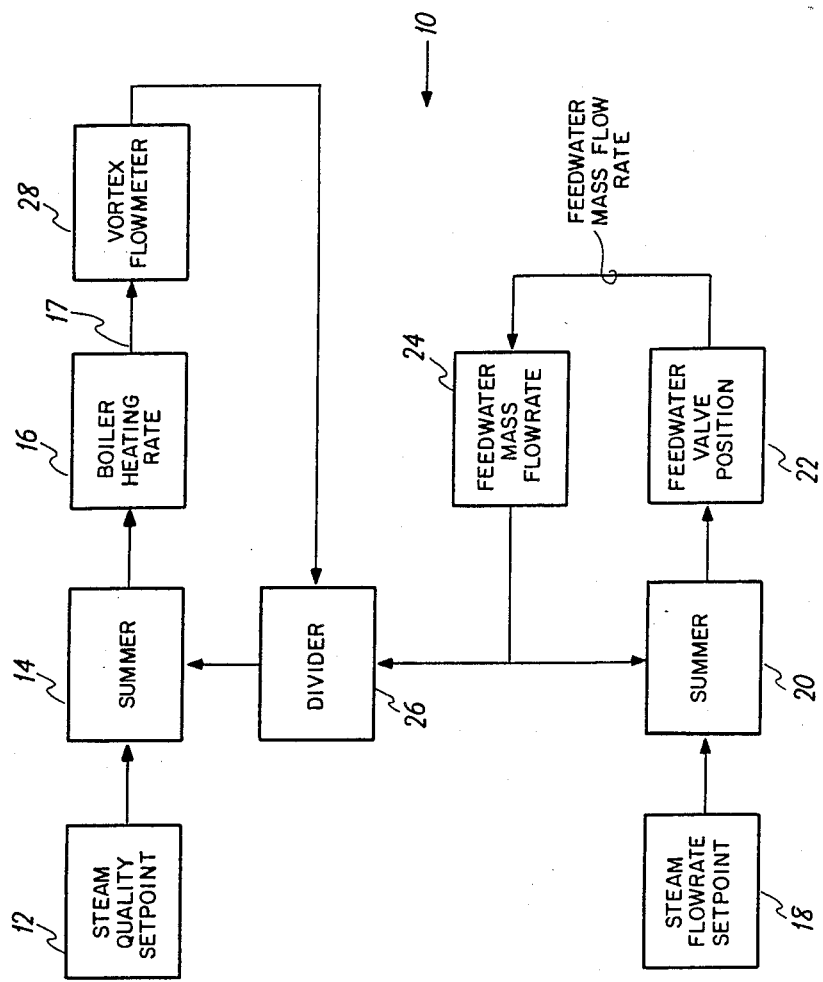
FIG. 3 shows an operational block diagram for a simple control scheme for implementing the present invention.

A simple control scheme 10 according to the invention, for the experimental tests is shown in FIG. 3, in which only two variables are controlled: the steam quality set point and the mass flow rate. The feedwater flow rate is controlled by a valve, and the feedback signal is generated by a vortex flowmeter. The boiler heating rate varies the steam quality. The feedback signal is the ratio of a signal (derived from the vortex frequency output) from the flowmeter to the feedwater mass flow rate. In FIG. 3, a desired steam quality setpoint 12 value is supplied a first summer 14, the output of which adjusts the temperature of a boiler 16 producing a steam flow of the desired quality, here represented as 17. The desired steam flow rate setpoint 18 value is supplied a second summer 20, which controls the feedwater valve position 22 and thus the feedwater mass flow rate 24. The latter value is supplied to the second summer and also to ratio block 26. The vortex flowmeter 28 measures the steam flow 17 velocity, providing a frequency output which is related to the steam quality to flowmeter signal processor 30, the output of which provided to ratio block 26. The output of ratio block 26 is provided to the first summer controlling the boiler heating rate.

Figure 4:
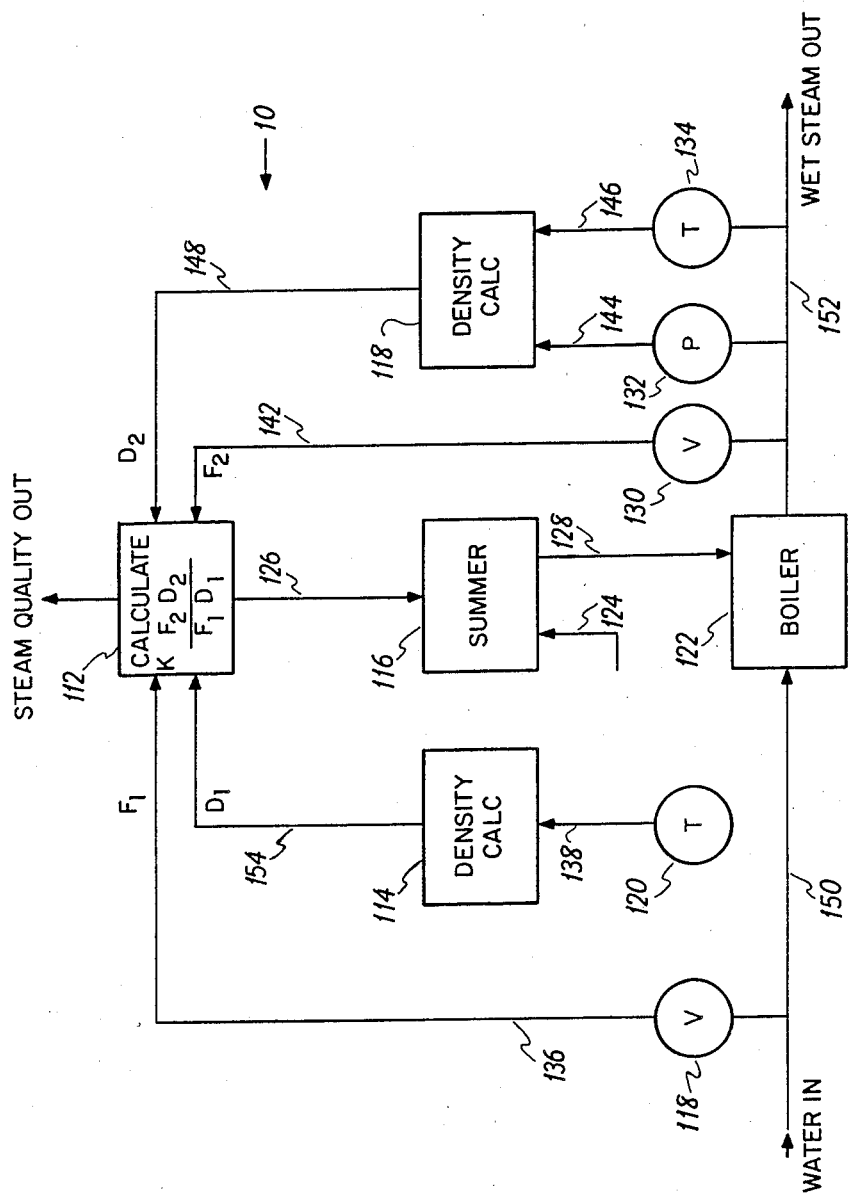
FIG. 4 shows a functional block diagram of an advanced control scheme for implementing the present invention.

In FIG. 4, a complete practical system is shown in which the mass flow must be calculated. Water enters boiler 122 via flowpipe 150. The water velocity and temperature are measured by a first flowmeter 118 (which may be a vortex flowmeter) and first temperature sensor 120. Boiler 122 converts the water to high-quality steam, the output of which is measured at pipe or manifold 152 by pressure sensor 132 and second temperature sensor 134. The second velocity sensor is a vortex flowmeter 130, oriented according to the present invention; it senses the velocity of the steam vapor phase. The first velocity signal $F_1$ is provided via line 136 to calculation block 112. The first density signal $D_1$ is derived in first density calculation block 114 and provided via line 154. A second density signal $D_2$ is derived in second density block 118 from the pressure and second temperatures signals on lines 144 and 146 from sensors 132 and 134, respectively, and provided via line 148. The second velocity signal $F_2$ is derived from vortex flowmeter 130, oriented according to the present invention, via line 142. The $F_1$, $F_2$, $D_1$, and $D_2$ signals are input to calculation block 112, where the steam quality is calculated according to Equation 2:

$$x = (K) F_2 D_2 / F_1 D_1 \qquad \text{Equation 2}$$

Calculation block 112 also provides a control output signal on line 126 to summer 116, which receives the steam quality setpoint via line 124. Summer 116 outputs the boiler control signal to boiler 122 via control line 128. Additional controls may be required in practice to carry out steam flow regulation, but such control apparatus is known to those of ordinary skill in the art and is beyond the scope of the presently claimed invention.

It is often not possible to determine so directly the mass flow rate by merely determining the feedwater input. Such cases may occur in the enhanced oil recovery situations where the steam to be measured is less than all of the boiler output, or in a single steam supply pipe remote from the boiler. In such case the output signal of a sensor which measures void fraction can be combined with that of the vortex shedding flowmeter to derive a signal proportional to steam quality. Such a measurement is a suitable substitute for that of the mass flow rate. Methods to determine the void fraction are known to those of ordinary skill in the art; one method is to make a measurement of the electrical capacitance of the fluid within the pipe. Lee suggests such a method. It is important for proper operation of the vortex flowmeter that such measurements be made without intrusion into the flow stream.

A more accurate measure of the heat delivered to the sandface can be obtained if the measurement is made within the pipe through which the steam is injected. The injection pipe is normally oriented vertically and the effect of gravity that creates a liquid film in horizontally oriented pipes is not present. Under such conditions the above-described method is still applicable, but the restriction upon the orientation of the shedder need not be imposed.

Although the invention has been described with regard to a particular embodiment directed to the measurement of two-phase fluid flows, and particularly of steam quality, it is not intended that the scope of the invention be limited to apparatus and method for measuring steam quality, but rather also comprehends measurement more generally of two-phase fluid flows, as is indicated by the claims appended hereto.

We claim:

1. Apparatus for measuring two-phase flows output from a boiler having water feed and steam output via a flowpipe, comprising:
    (a) a horizontally disposed flowpipe carrying from said boiler a two-phase fluid having a vapor phase and a liquid phase;
    (b) a first flowmeter means for producing an output signal related to the water feed flow input to said boiler;
    (c) a first temperature measuring means for producing an output signal related to the water feed temperature input to said boiler;
    (d) first density calculation means for producing a boiler feed density signal from said first temperature measuring means;
    (e) a vortex flowmeter for producing a second velocity signal related to the vapor phase flow rate of said two-phase fluid output from said boiler, said vortex flowmeter having a horizontally disposed vortex generating bar mounted transversely within said flowpipe;
    (f) means for determining the density of the vapor phase of said two-phase fluid and producing a density signal therefrom; and
    (g) calculation block means for deriving the two-phase flow measurand from said first and second density signals, said first flow velocity signal, and said second velocity signal.

2. Apparatus as in claim 1, said calculation block including means to derive the two-phase flow measurand according to the formula $x = (K) F_2 D_2 / F_1 D_1$.

3. Apparatus as in claim 1, wherein said two-phase flow is wet steam.

* * * * *